United States Patent
Kanaoka et al.

(10) Patent No.: US 9,855,653 B2
(45) Date of Patent: Jan. 2, 2018

(54) MASTER-SLAVE SYSTEM

(71) Applicant: Muscle Corporation, Osaka (JP)

(72) Inventors: Katsuya Kanaoka, Shiga (JP); Ryo Kikuuwe, Fukuoka (JP)

(73) Assignee: Muscle Corporation, Osaka (JP)

( * ) Notice: Subject to any disclaimer, the term of this patent is extended or adjusted under 35 U.S.C. 154(b) by 88 days.

(21) Appl. No.: 15/033,688

(22) PCT Filed: Nov. 5, 2014

(86) PCT No.: PCT/JP2014/079304
§ 371 (c)(1),
(2) Date: May 2, 2016

(87) PCT Pub. No.: WO2015/068716
PCT Pub. Date: May 14, 2015

(65) Prior Publication Data
US 2016/0279788 A1    Sep. 29, 2016

(30) Foreign Application Priority Data
Nov. 7, 2013   (JP) .................. 2013-230820

(51) Int. Cl.
*G05B 19/04* (2006.01)
*B25J 3/04* (2006.01)
(Continued)

(52) U.S. Cl.
CPC ............ *B25J 3/04* (2013.01); *B25J 9/1607* (2013.01); *B25J 9/1689* (2013.01); *B25J 13/025* (2013.01); *G05B 2219/40333* (2013.01)

(58) Field of Classification Search
CPC .......... B25J 3/04; B25J 9/1607; B25J 9/1689; B25J 13/025
See application file for complete search history.

(56) References Cited

U.S. PATENT DOCUMENTS

2003/0034994 A1* 2/2003 Massie ................. B25J 9/1689
                                                        715/701
2006/0293617 A1* 12/2006 Einav ................... A61H 1/0274
                                                        601/33
(Continued)

FOREIGN PATENT DOCUMENTS

JP         07-136949       5/1995
JP         2001-300871    10/2001
(Continued)

OTHER PUBLICATIONS

Miyazaki, et al., Parallel Control Method for a Bilateral Master-Slave Manipulator, Journal of the Robotics Society of Japan, vol. 7, No. 5, pp. 446-452, Oct. 1989.
Yokokohji, et al., Maneuverability of Master-Slave Telemanipulation Systems, Transactions of the Society of Instrument and Control Engineers, vol. 26, No. 5, pp. 572-579, 1990.
(Continued)

*Primary Examiner* — Ian Jen
(74) *Attorney, Agent, or Firm* — Kirschstein, Israel, Schiffmiller & Pieroni, P.C.

(57) ABSTRACT

A master-slave system (1) according to the present invention includes at least one master displacement sensor ($Pm_1$ to $Pm_3$) for measuring a master displacement for a master robot, at least one slave displacement sensor ($Ps_1$ to $Ps_3$) for measuring a slave displacement for a slave robot, a master target displacement calculating device (2) for mapping the slave displacement and thereby obtaining a master target displacement which is a target value for the master displacement corresponding to the slave displacement, and a master actuator ($Am_1$ to $Am_3$) for generating a master driving force to position-control the master robot on the basis of the master target displacement and the master displacement. The mapping is predefined such that a set of master target displacements excludes a singular configuration for the master robot. The master-slave system (1) renders it possible (Continued)

to solve a singular configuration problem for both the master robot and the slave robot.

5 Claims, 3 Drawing Sheets

(51) Int. Cl.
 *B25J 9/16* (2006.01)
 *B25J 13/02* (2006.01)

(56) References Cited

U.S. PATENT DOCUMENTS

| | | | |
|---|---|---|---|
| 2007/0225620 A1* | 9/2007 | Carignan | A61H 1/0281 601/5 |
| 2007/0282228 A1* | 12/2007 | Einav | A63B 21/4021 601/33 |
| 2008/0009771 A1* | 1/2008 | Perry | B25J 9/0006 600/587 |
| 2010/0041991 A1 | 2/2010 | Roundhill | |
| 2017/0202724 A1* | 7/2017 | De Rossi | A61H 3/00 |

FOREIGN PATENT DOCUMENTS

| | | |
|---|---|---|
| JP | 2009-012125 | 1/2009 |
| JP | 2011-189445 | 9/2011 |
| JP | 5105450 | 10/2012 |
| JP | 2014-157548 | 8/2014 |

OTHER PUBLICATIONS

Tachi et al., Impedance Controlled Master-Slave Manipulation System Part I: Basic Concept and Application to the System with Time Delay, Journal of the Robotics Society of Japan, vol. 8 No. 3, pp. 241-252, Jun. 1990.

Yoshinada, A Study on the Large Scale Bilateral Manipulator, Tokyo Institute of Technology Doctoral Thesis, 2012.

Kotosaka et al., Selective Utilization of Actuator for a Humanoid Robot by Singular Configuration, Journal of the Robotics Society of Japan, vol. 25 No. 8, pp. 1259-1265, Nov. 2007.

Arai et al., Bilateral Master-Slave Control for Manipulators with Different Configurations, Journal of the Robotics Society of Japan, vol. 4 No. 5, pp. 469-479, Oct. 1986.

Yoshinaga et al., Different Configuration Master-Slave Robot Arms System by Two Industrial Robots, Proceedings of Robotics and Mechatronics Conference 2008, The Japan Society of Mechanical Engineers, 1A1-G16, Jun. 2008.

Tsumaki et al., Singularity-Consistent Teleoperation of a 6-DOF Manipulator, Journal of the Robotics Society of Japan vol. 16, No. 2, pp. 195-204, Mar. 1998.

Brooks, Telerobotic Response Requirements, Proceedings of the IEEE International Conference on Systems, Man ad Cybernetics, pp. 113-120, 1990.

Pieper, The Kinematics of Manipulators Under Computer Control, Stanford Artificial Intelligence Report, memo No. AI-72, Oct. 1968.

Kikuuwe et al., Proxy-Based Sliding Mode Control: A Safer Extension of PID Position Control, IEEE Transactions on Robotics, vol. 26, No. 4, pp. 670-683, Aug. 2010.

\* cited by examiner

MASTER-SLAVE SYSTEM

TECHNICAL FIELD

The present invention relates to a master-slave system to which force-projecting bilateral control is applied.

BACKGROUND ART

The so-called master-slave system originated from a mechanical master-slave system in which a master robot and a slave robot are mechanically linked so as to work in coordination with each other. The mechanical master-slave system is advantageous in that the operator can have a direct feel of operation, but also disadvantageous in that: the degree of freedom in mechanism design is limited because of geometric restrictions between the operator and the master robot and also between the operator and the slave robot; the system naturally feels heavy to manipulate because the system is driven by human power; and further, the system has trouble in ensuring safety when abnormalities arise.

Therefore, although the mechanical master-slave system is still considered useful, the current mainstream is an electrical master-slave system in which the master robot and the slave robot are electrically interconnected but mechanically separated, and are operable independently of each other. In general, the electrical system can be flexibly controlled with electrical means or by means of software, and can have a mechanism that can be designed with flexibility, and further, the safety of the system can be ensured readily by constructing the system such that the operator is not involved in the working space of a high power actuator.

The electrical master-slave system having these characteristics has been developed mainly for such an application as remote control (i.e., teleoperation), and therefore, the study thereof was carried out mainly focusing on improvements in position and force repeatability, transparency, or communication time delay. An overview description will be provided below regarding basic types of bilateral control for the electrical master-slave system.

First, for convenience of explanation, the equations of motion that represents the dynamics of the master robot and the slave robot are defined by way of example as follows:

[Expression 1]

$$J_m^T f_m + \tau_m = M_m \ddot{q}_m + r_m \qquad (1);$$

[Expression 2]

$$\tau_s = M_s \ddot{q}_s + r_s + J_s^T f_s \qquad (2),$$

where $f_m(t)$ is a master operating force applied to the master robot by the operator at time t, and $f_s(t)$ is a slave working force applied to the environment (i.e., a work object) by the slave robot at the same time t. Furthermore, respectively for the master robot and the slave robot, $q_m(t)$ and $q_s(t)$ are joint displacements, $\tau_m(t)$ and $\tau_s(t)$ are joint driving forces, $M_m(q_m)$ and $M_s(q_s)$ are inertia matrices, and $r_m(q^\bullet_m, q_m)$ and $r_s(q^\bullet_s, q_s)$ remainder terms aggregating effects other than inertia. $J_m(q_m)$ and $J_s(q_s)$ are Jacobian matrices representing differential kinematics and satisfying the following relationship:

[Expression 3]

$$\dot{x}_m = J_m \dot{q}_m \qquad (3);$$

[Expression 4]

$$\dot{x}_s = J_s \dot{q}_s \qquad (4),$$

where $x_m(t)$ and $x_s(t)$ are displacements of an operating end of the master robot and a working end of the slave robot in a work coordinate system respectively corresponding to $q_m(t)$ and $q_s(t)$. Note that symbols, such as "(t)", which indicate independent variables of a function might be omitted herein.

[Position-Symmetric Bilateral Control]

Position-symmetric bilateral control is bilateral displacement error servo control between the master and the slave. This control eliminates the need for a force sensor, and therefore, renders it possible to readily configure a relatively stable system. In the case where proportional control in the work coordinate system is used, control laws for the master robot and the slave robot are, for example, as shown below:

[Expression 5]

$$\tau_m = J_m^T S_f^{-1} K_p (x_a - S_p^{-1} x_m) \qquad (5);$$

[Expression 6]

$$\tau_s = J_s^T K_p (S_p^{-1} x_m - x_s) \qquad (6),$$

where $K_p$ is a position control gain. Moreover, $S_f$ is the scale ratio of force from the master robot to the slave robot, and $S_p$ is the scale ratio of displacement from the slave robot to the master robot.

From the master dynamics (1), the slave dynamics (2), the master control law (5), and the slave control law (6), the following expression is obtained.

[Expression 7]

$$f_m = J_m^{-T}(M_m \ddot{q}_m + r_m) + S_f^{-T} J_s^{-T}(M_s \ddot{q}_s + r_s) + S_f^{-1} f_s \qquad (7)$$

In this manner, in the position-symmetric bilateral control, the influence of the master dynamics is added to the master operating force $f_m$ as is, and the influence of the slave dynamics and the slave working force $f_s$ are also added by a factor of $S_f^{-1}$.

[Force-Reflecting Bilateral Control]

In force-reflecting bilateral control, a working force sensor for measuring the slave working force $f_s$ is disposed at the working end of the slave robot in order to "reflect" the slave working force $f_s$ in the force of driving the master. In this case, the master control law is as shown below. Note that the slave control law is the same as Expression (6) for the position-symmetric bilateral control.

[Expression 8]

$$\tau_m = -J_m^T S_f^{-1} f_s \qquad (8)$$

From the master dynamics (1) and the master control law (8), the following expression is obtained.

[Expression 9]

$$f_m = J_m^{-T}(M_m \ddot{q}_m + r_m) + S_f^{-1} f_s \qquad (9)$$

In the case of the force-reflecting bilateral control, as in the case of the position-symmetric bilateral control, the influence of the master dynamics is added to the master operating force $f_m$ as is, and the slave working force $f_s$ is also added by a factor of $S_f^{-1}$. On the other hand, the master operating force $f_m$ is not influenced by the slave dynamics.

[Force-Reflecting Servo Bilateral Control]

In force-reflecting servo bilateral control, an operating force sensor for measuring the master operating force $f_m$ is disposed at the operating end of the master robot, a working force sensor for measuring the slave working force $f_s$ is disposed at the working end of the slave robot, and a force error servomechanism is configured on the master side. In this case, the master control law is as shown below.

[Expression 10]

$$\tau_m = J_m^T K_f(f_m - S_f^{-1} f_s) - J_m^T S_f^{-1} f_s \qquad (10)$$

The above expression includes force error servo control in addition to the master control law (8) for the force-reflecting type. Note that $K_f$ is a force control gain. Moreover, the slave control law is the same as in Expression (6) for the position-symmetric bilateral control.

From the master dynamics (1) and the master control law (10), the following expression is obtained. Note that I is an identity matrix.

[Expression 11]

$$f_m = (I + K_f)^{-1} J_m^{-T}(M_m \ddot{q}_m + r_m) + S_f^{-1} f_s \qquad (11)$$

By increasing the force control gain $K_f$ in the above expression to a sufficient degree, the following expression can be obtained.

[Expression 12]

$$f_m \approx S_f^{-1} f_s \qquad (12)$$

In this manner, in the case of the force-reflecting servo bilateral control, by sufficiently increasing the force control gain $K_f$, the influence of the master dynamics on the master operating force $f_m$ can be reduced to a negligible degree, so that only the slave working force $f_s$ is added to the master operating force $f_m$ by a factor of $S_f^{-1}$. However, for implementation reasons, the stability of bilateral control decreases as the force control gain $K_f$ increases, and therefore, it is difficult to eliminate the influence of the master dynamics on the master operating force $f_m$, so that complete transparency cannot be achieved.

[Parallel Bilateral Control]

In Non-Patent Document 1, Miyazaki et al. propose parallel bilateral control, which is an improvement to the traditional serial connection method for bilateral control. In the case of the parallel type, an operating force sensor for measuring the master operating force $f_m$ is disposed at the operating end of the master robot, a working force sensor for measuring the slave working force $f_s(t)$ is disposed at the working end of the slave robot, and a parallel displacement error servo mechanism is configured by the master and the slave. In this case, the control laws are as shown below:

[Expression 13]

$$\tau_m = J_m^T K_p(x_d - S_p^{-1} x_m) \qquad (13);$$

[Expression 14]

$$\tau_s = J_s^T S_j K_p(x_d - x_s) \qquad (14);$$

[Expression 15]

$$x_d = K_f(f_m - S_f^{-1} f_s) \qquad (15),$$

Note that $x_d(t)$ is a target displacement for each of the operating end of the master robot and the working end of the slave robot at time t in the work coordinate system.

From the master dynamics (1), the slave dynamics (2), the master control law (13), the slave control law (14), and the target displacement calculation (15), the following expression can be obtained.

[Expression 16]

$$f_m = (I + 2K_p K_f)^{-1} J_m^{-T}(M_m \ddot{q}_m + r_m) + (I + 2K_p K_f)^{-1} S_f^{-1} J_s^{-T}(M_s \ddot{q}_s + r_s) + (I + 2K_p K_f)^{-1} * K_p (S_p^{-1} x_m + x_s) + S_f^{-1} f_s \qquad (16)$$

Furthermore, by increasing the force control gain $K_f$ in the above expression to a sufficient degree, the following expression can be obtained.

[Expression 17]

$$f_m \approx S_f^{-1} f_s \qquad (17)$$

The advantage of the parallel bilateral control is that phase lag is reduced by providing the master control law and the slave control law in parallel, resulting in bilateral control with increased stability. However, in the case of the parallel bilateral control, the master operating force $f_m$ is influenced by both the master dynamics and the slave dynamics, as can be seen from the first and second terms of the right-hand side of Expression (16). Moreover, in the case of the parallel bilateral control, even a spring constant term, which is not included in the original dynamics, is added to the master operating force $f_m$, as can be seen from the third term of the right-hand side of Expression (16). Such influences can be reduced to a negligible degree by increasing the force control gain $K_f$, but for implementation reasons, even the increased stability of the bilateral control can be weakened as the force control gain $K_f$ increases, and therefore, even the parallel bilateral control cannot achieve complete transparency.

[Force-Projecting Bilateral Control]

The basic types of bilateral control, including the position-symmetric type, the force-reflecting type, the force-reflecting servo type, and the parallel type, have been described so far, and conventional bilateral control, including these types, has Problems 1 through 6 as follows:

[Problem 1] A problem common among the force-reflecting type, the force-reflecting servo type, and the parallel type.

Information about the slave working force $f_s$ is required for control, and therefore, application to a system in which the working force sensor cannot be mounted on the slave robot is not possible.

[Problem 2] A problem common between the position-symmetric type and the force-reflecting type.

Control drives the system in accordance with displacement error of the master robot, and therefore, it is necessary to set the inertia and the friction of the master robot as little as possible, such that displacement error of the master robot can be readily generated by human power, i.e., high backdrivability is ensured, resulting in difficulty in achieving a highly accurate mechanism.

[Problem 3] A problem common between the force-reflecting servo type and the parallel type.

Control is intended to achieve transparency, and therefore, the operator mainly senses only the dynamics of the environment (i.e., a work object).

[Problem 4] A problem common among the position-symmetric type, the force-reflecting type, the force-reflecting servo type, and the parallel type.

The slave robot is always connected to the master robot, and therefore, there is a risk that unstable behavior might be excited in the system solely by an external force applied to the slave robot, even without the operator manipulating the master robot.

[Problem 5] A problem common among the position-symmetric type, the force-reflecting type, the force-reflecting servo type, and the parallel type.

A command value for the slave robot is position-related, and the slave dynamics need to be cancelled by positional control, which imposes a large burden on the control system. In addition, the control law based on the positional control does not necessarily allow another control law to be superimposed thereon.

[Problem 6] A problem common among the position-symmetric type, the force-reflecting type, the force-reflecting servo type, and the parallel type.

When positional control in the work coordinate system is applied to the slave robot, a singular configuration problem might arise, so that control failure might occur when the posture of the slave robot approaches a singular configuration.

As new bilateral control capable of neatly solving these problems, the present inventor proposes the basic configuration of "force-projecting bilateral control" in Patent Document 1. In the force-projecting type, an operating force sensor for measuring the master operating force $f_m$ is disposed at the operating end of the master robot, and the measured master operating force $f_m$ is "projected" to the force of driving the slave robot. In the force-projecting bilateral control, the master control law and the slave control law are, for example, as shown below:

[Expression 18]

$$\tau_m = J_m^T K_p (S_p x_s - x_m) \qquad (18)$$

[Expression 19]

$$\tau_s = J_s^T S_f f_m \qquad (19)$$

From the slave dynamics (2) and the slave control law (19), the following expression can be obtained.

[Expression 20]

$$f_m = S_f^{-1} J_s^T (M_s \ddot{q}_s + r_s) + S_f^{-1} f_s \qquad (20)$$

In this manner, in the case of the force-projecting bilateral control, the influence of the slave dynamics and the slave working force $f_s$ are added to the master operating force $f_m$ by a factor of $S_f^{-1}$. That is, the force-projecting bilateral control is an approach to measure the master operating force $f_m$ applied to the master robot by the operator, rather than the slave working force $f_s$ applied to the environment (i.e., a work object) by the slave robot, and allow the master to pass force information forward to the slave while allowing the slave to feed displacement information back to the master.

The force-projecting bilateral control has Characteristics 1 through 6 as shown below:

[Characteristic 1] Applicable to even a system in which the working force sensor cannot be mounted on the slave robot, because no information about the slave working force $f_s$ is needed.

[Characteristic 2] Not requiring the master robot to have backdrivability because the system is driven by the master operating force $f_m$ applied to the master robot by the operator, rather than in accordance with displacement error of the master robot, so that the master robot can be rendered to be a mechanism which is robust enough to withstand human power and highly accurate.

[Characteristic 3] Being control that is intended to achieve "projectivity" to be described later, rather than transparency, and therefore, allowing the operator to feel the dynamics of the environment (i.e., a work object) and even the slave dynamics, but no master dynamics.

[Characteristic 4] No risk of unstable behavior being excited in the system solely by an external force applied to the slave robot because the connection from the master robot to the slave robot is shut off (i.e., the connection therebetween changes from bilateral to unilateral) unless the operator applies the master operating force $f_m$ to the master robot.

[Characteristic 5] The command value for the slave robot is related to drive power (force and torque), rather than position-related, which facilitates the implementation of the slave control law, and imposes little burden on the control system. The control is based on drive power, and therefore, any type of control based on drive power can be superimposed on the slave control law.

[Characteristic 6] The slave robot is not position-controlled but is controlled in terms of drive power, and therefore, no singular configuration problem occurs even if the control in the work coordinate system is applied, so that control failure does not occur even if the posture of the slave robot approaches a singular configuration.

Characteristics 1 through 6 above will be described in more detail.

First, "Characteristic 1" will be described. In most of the conventional types of bilateral control, such as the force-reflecting type, the force-reflecting servo type, and the parallel type, the working force sensor for measuring the slave working force $f_s$ is mounted on the working end of the slave robot in order to enhance the feel of operation of the master-slave system. However, some systems often involve difficulty in mounting the working force sensor on the working end of the slave robot.

For example, in the case of a power-amplifying master-slave system, the slave robot has a high power actuator disposed thereon. Accordingly, the slave robot is required to be hardware that can withstand such high power. However, multi-axis force sensors, which are generally used as working force sensors, are delicate and expensive, and therefore, it is difficult to mount such a sensor on the working end of the high-power slave robot. Moreover, in the case of a master-slave system serving as a surgical robotic system, the slave robot is required to be invasive to the human body, and the hardware thereof needs to be subjected to high-level cleaning, disinfection, and sterilization (autoclave sterilization). It is difficult to mount a multi-axis force sensor, which is a complex electronic device, on the working end of such a slave robot.

In the case of the force-projecting bilateral control, it is simply required to mount a force sensor (i.e., an operating force sensor) on the master robot, which does not have such mounting difficulty. In addition, the slave robot can be provided in the simplest configuration only including an actuator and a displacement sensor. Thus, it is relatively easy to equip most systems with the force-projecting bilateral control.

Next, "Characteristic 2" will be described. In most of the conventional types of bilateral control, such as the position-symmetric type and the force-reflecting bilateral control, the system is driven not directly by the master operating force $f_m$ applied to the master robot but in accordance with displacement error of the master robot caused by the master operating force $f_m$. In this case, to enhance the feel of operation, the master robot is required to be so-called backdrivable so as to be movable even by human power. Moreover, to this end, it is necessary to reduce the inertial mass and the friction of the master robot as much as possible. Under such circumstances, in the case of the conventional bilateral control, the master robot is naturally a powerless and delicate mechanism with a low reduction ratio. This means that the master robot tends to lack the rigidity and output power required to provide a reaction force to the operator with high accuracy.

On the other hand, in the case of the force-projecting bilateral control, the system is driven by the master operating force $f_m$ applied to the master robot, and therefore, the master robot does not have to be backdrivable so long as the master operating force $f_m$ can be measured. Accordingly, in the case of the force-projecting bilateral control, the master robot can be provided as a robust and powerful mechanism with a high reduction ratio, and also can provide a reaction force to the operator with high accuracy. Note that since the mechanism is intended for the master robot, it is simply required to ensure that the mechanism is robust enough to merely withstand human power. Accordingly, being provided with the operating force sensor for measuring the master operating force $f_m$ is not a disadvantage when ensuring robustness, even if the operating force sensor is a multi-axis force sensor.

Next, "Characteristic 3" will be described. In the case of both the force-reflecting type and the force-reflecting servo bilateral control where the working force sensor is disposed on the slave robot, particularly where the working force sensor is provided on the working end of the slave robot, the operator does not feel the slave dynamics, as can be appreciated from Expressions (9) and (11). On the other hand, the operator feels the master dynamics, and therefore, the critical norm "transparency" for the conventional bilateral control is realized by reducing the influence of the master dynamics to a negligible degree. That is, in the case of the conventional bilateral control, also for a different reason from that described in conjunction with "Characteristic 2", the master robot needs to be a powerless and delicate mechanism with a low reduction ratio.

However, the present inventor submits that there is room for reconsideration of the very norm "transparency" for the conventional master-slave systems, and therefore, proposes herein a new norm. More specifically, as opposed to the conventional norm "transparency" intended to render both the master dynamics and the slave dynamics "transparent" and provide the operator with a direct feel of operation of only manipulating the environment (i.e., a work object), the new norm is intended to "project" the master operating force $f_m$ from the operator as the force of driving the slave and also "project" the slave dynamics, even including the dynamics of the environment (i.e., a work object), as a master displacement, thereby providing the operator with the feel of operation of manipulating the environment (i.e., a work object) and even the slave robot. This new norm is referred to below as "projectivity". It can be said that the more accurate the projection of the master operating force $f_m$ to the force of driving the slave becomes, or as the more accurate the projection of the dynamics of the environment (i.e., a work object) and the dynamics of the slave to a master displacement becomes, the higher the degree of projectivity becomes.

To put it qualitatively, in the case of a conventional master-slave system with high transparency, the operator does not feel the sense of the master-slave system, and therefore, feels as if he/she was directly manipulating the environment (i.e., a work object) using his/her own body. On the other hand, in the case of a master-slave system with high projectivity, the operator does not feel the sense of the master robot, and therefore, feels as if he/she was moving the slave robot using his/her own body and manipulating the environment (i.e., a work object) through the slave robot. That is, in other words, it can be said that the norm "transparency" aims to realize "the sense of manipulating a target with an actual human body", whereas the norm "projectivity" aims to realize "the sense of manipulating a target via an exoskeleton".

Therefore, the present inventor refers to the state where ideal projectivity is realized as "exoprojection". By realizing exoprojection, it is rendered possible to allow the operator to feel as if the slave robot, whose portions at least other than the trunk operate mechanically independent of the master robot, is mechanically interlocked with the master robot even at the portions other than the trunk. Moreover, it is also rendered possible for the operator not to feel the sense of the master robot, which merely serves as an operating device, but to feel the slave robot, which serves as a working device, to be an exoskeleton actually being put on the operator himself/herself. The term "exoprojection" derives from such an effect.

In Non-Patent Document 2, on p. 575, Yokokohji et al. define "ideal response(s)", which is synonymous with the term "transparency", as follows:

"when the operator applies a certain operating force, positional responses $x_m$ and $x_s$ of master and slave arms always match force responses $f_m$ and $f_s$ regardless of the target to be handled".

In accordance with the notation considering the scale ratio $(S_f, S_p)$ herein, the ideal responses can be represented as shown below.

[Expression 21]

$$x_m = S_p x_s \qquad (21)$$

[Expression 22]

$$S_f f_m = f_s \qquad (22)$$

In Non-Patent Document 2, the state where the ideal responses are realized is referred to as the state where object teleperception is possible. However, to realize such ideal responses, all dynamics of the master-slave system, along with inertia, need to be eliminated, which imposes a large burden on the control system, resulting in a high probability of unstable bilateral control (see Non-Patent Document 3). This can also be appreciated from the fact that the force control gain $K_f \to \infty$ is essential to realize the force transparency (22) in Expression (11) for the force-reflecting servo bilateral control or in Expression (16) for the parallel bilateral control.

On the other hand, ideal responses for the "projectivity" defined by the present inventor can be represented as shown below.

[Expression 23]

$$x_m = S_p x_s \qquad (23)$$

[Expression 24]

$$J_s^T S_f f_m = \tau_s \qquad (24)$$

The state where the ideal responses are realized is "exoprojection". To realize exoprojection, it is not necessary to eliminate the slave dynamics. This is advantageous particularly for the power-amplifying master-slave system. In the power-amplifying master-slave system, the slave robot is often larger than the master robot, and is also dominant in terms of inertia. Reducing the burden of eliminating the dominant inertia of the slave robot contributes considerably to enhancement of stability of the control system.

Furthermore, as a norm, projectivity is more advantageous than transparency particularly in the case where the operator acquires the skills of "machine-friendly manipulation" in the master-slave system (with differences in structure, degree of freedom, and scale) in which the master robot and the slave robot have considerably different dynamics from each other.

For example, in the case of a master-slave system with a difference in scale where the master robot and the slave robot are significantly different in scale, by using projectivity as a norm, it is rendered possible to present the operator with scale effects not only of the environment (i.e., a work object) but also of the slave dynamics. The operator can be prompted to perform appropriate manipulation by being presented with the effect of inertia caused in the case where the slave robot is larger than the master robot (more specifically, in such a state where the master robot is moved around by the slave robot keeping on moving inertially), so that it can be expected that the operator makes manipulation efficient and optimal using his/her own skill. In the case of a system making "transparency", rather than "projectivity", as a norm, the operator is not presented with the scale effect of the slave dynamics, and therefore, it is not expected that the operator performs such efficient and optimal manipulation.

As described above, in the case of the force-projecting bilateral control, by disposing the operating force sensor at the operating end of the master robot, it is rendered possible to make the master dynamics transparent, as is indicated by Expression (20), and achieve high projectivity, i.e., exoprojection, to allow the operator to be provided with the sense of manipulating the environment (i.e., a work object) through the slave robot. In addition, in the case of the force-projecting bilateral control, to realize the force-related projectivity expressed by Expression (24), it is not necessary to make the force control gain $K_f$ infinite.

Next, "Characteristic 4" will be described. In the case of the master operating force $f_m=0$ where the operator does not act on the master robot, the master-slave system is driven solely by an external force $-f_s$. The external force $-f_s$ can be obtained for the position-symmetric type by Expression (7), also for the force-reflecting type by Expression (9), and further for the force-reflecting servo type by Expression (11), as shown below.

[Expression 25]

$$-f_s = S_f J_m^{-T}(M_m \ddot{q}_m + r_m) + J_s^{-T}(M_s \ddot{q}_s + r_s) \quad (25)$$

[Expression 26]

$$-f_s = S_f J_m^{-T}(M_m \ddot{q}_m + r_m) \quad (26)$$

[Expression 27]

$$-f_s = S_f (I + K_f)^{-1} J_m^{-T}(M_m \ddot{q}_m + r_m) \quad (27)$$

Expressions (25) through (27) indicate that in the case of the conventional bilateral control (such as the position-symmetric type, the force-reflecting type, and the force-reflecting servo type), when the slave robot receives the external force $-f_s$, the slave robot operates under the influence of the dynamics of the master robot, which is merely an operating device. Moreover, depending on the situation, there is a risk of unstable behavior being excited in the master-slave system solely by the external force $-f_s$ applied to the slave robot. Although not described herein, the same can be said of the parallel bilateral control. Regarding this problem, Non-Patent Document 4 points out on p. 24 that in the case of both the force-reflecting type and the force-reflecting servo bilateral control, when the operator takes his/her hand off the operating end of the master robot, the system tends to exhibit unstable behavior. The tendency becomes more marked particularly in the case where the force control gain $K_f$ is set high so as to increase transparency both in the force-reflecting servo type and the parallel bilateral control.

On the other hand, in the case of the force-projecting bilateral control, the external force $-f_s$ can be obtained by the following expression based on Expression (20).

[Expression 28]

$$-f_s = J_s^{-T}(M_s \ddot{q}_s + r_s) \quad (28)$$

The slave robot operates under the influence of its own dynamics upon reception of the external force $-f_s$. Moreover, the external force $-f_s$ is not influenced by the master dynamics at all, and therefore, it can be appreciated that, where the master operating force $f_m=0$, the connection from the master to the slave is automatically shut off, resulting in unilateral connection regardless of the force control gain $K_f$. In this manner, in the case of the force-projecting bilateral control, there is no risk of unstable behavior being excited in the master-slave system solely by the external force $-f_s$ applied to the slave robot.

Next, "Characteristic 5" will be described. In the master-slave systems, the master robots are provided only to be operated by humans, and therefore, the master robots are sized to such a scale as to be readily operable by humans, and are placed in environments comfortable to humans. However, the slave robots are required to employ a number of hardware structures so as to be operable in a wide variety of environments in accordance with tasks to be achieved. For example, the power-amplifying master-slave system requires the slave robot to output high power, and therefore, the slave robot might employ a hydraulic actuator, rather than an electromagnetic actuator. Also, in a master-slave system serving as a surgical robotic system, the slave robot might employ a pneumatic actuator. Furthermore, in most of the conventional types of bilateral control, the operator's will is reflected in specifying a target position of the slave robot, so that the slave robot is position-controlled.

As is well-known, when compared to the electromagnetic actuator, the hydraulic actuator and the pneumatic actuator have low position (trajectory) control performance. Accordingly, to accurately reflect the operator's will in the hydraulic or pneumatic actuator using the conventional bilateral control, it is necessary to apply a high-level and complicated positional control law, and implementing such a control law is expected to be difficult.

However, in the case of the force-projecting bilateral control, the operator's will is reflected in specifying a target driving force for the slave robot, and the slave robot is controlled in terms of driving force. In the case of force-projecting bilateral control employing a hydraulic or pneumatic actuator, the slave robot is controlled in terms of driving force by specifying a target pressure, rather than a target position, of the hydraulic or pneumatic actuator. Such pressure control of a hydraulic or pneumatic actuator is generally performed using a hydraulic or pneumatic control valve, and can be implemented without difficulty.

It is a matter of course that even if the force-projecting bilateral control is implemented so as to perform driving force control, the operator is not ensured to perform positional control on the slave robot with high accuracy, and it can be said that performing high-level and complex positional control, as is performed by a computer in accordance with the control law for the conventional bilateral control, is left to the operator's skill. However, it is without doubt that driving force control is implemented with ease, and the operator's will is accurately reflected in the slave robot as slave driving force. In addition, in the case of the force-projecting bilateral control, the operator can even intuitively know whether controllability of the hydraulic or pneumatic actuator is good, which is rendered less noticeable by the positional control law in the conventional bilateral control.

Furthermore, although the driving force control is left to the operator's skill, if there is any nonlinearity in slave dynamics which cannot be handled by the operator, the operator's skill can be backed up by superimposing dynamics compensation algorithms (e.g., gravity compensation and friction compensation) on the driving force control for the slave robot. In the case of the force-projecting bilateral control where the slave robot is controlled in terms of driving force, it is possible to simply superimpose control laws on each other, and vast knowledge on driving force control accumulated over a long history of robot control engineering can be utilized for backing up the operator's skill. For example, in one application, it is possible that the operator is allowed to feel the inertia of the slave robot, which is useful in manipulation, whereas nonlinear terms for the slave robot, which make manipulation difficult, are eliminated through compensation. Alternatively, it is also possible that different types of low-gain trajectory control for the slave robot are superimposed as if the operator was taken by the hand over the exoskeleton and guided, or a virtual wall to limit the range of movement of the slave robot is superimposed on the control for the slave robot. In the case where the slave robot is position-controlled, it is not necessarily possible to simply superimpose such control laws on each other, as described earlier.

Next, "Characteristic 6" will be described. In the master-slave system, the master robot is required to have operability, and the slave robot is required to have workability. To improve operability, the master robot needs to be designed ergonomically, whereas to improve workability, the slave robot needs to be designed so as to be adapted to tasks to be achieved. Accordingly, the master robot and the slave robot are naturally different in structure. Such a master-slave system including a master robot and a slave robot which are different in structure will be referred to as a double-structure master-slave system.

In the case of a single-structure master-slave system, there are limitations to enhancing both operability and workability. Accordingly, high-level master-slave systems inevitably become of a double-structure type. Moreover, it is typical of such a double-structure master-slave system to perform control in the work coordinate system, and also in the study up to this point herein, the control laws are premised by the control being performed in the work coordinate system.

In general, when a robot is position-controlled in the work coordinate system, the singular configuration problem occurs. The singular configuration refers to the posture of the robot (singular posture) for which the Jacobian matrix is irregular (i.e., no inverse matrix is obtained). At the singular configuration, the direction of the movement of the robot in the work coordinate system is limited. In the case where the robot's target trajectory is determined in the work coordinate system, the joint velocity for realizing the target trajectory becomes excessively high in the vicinity of the singular configuration. In addition, the actual robot can only have a limited joint velocity, so that there is a possibility where positional control in the work coordinate system might fail in the vicinity of the singular configuration. This encapsulates the singular configuration problem. Even if the position control law does not involve the inverse of the Jacobian matrix in computation, as in the case of Expression (6), positional control failure also occurs in the vicinity of the singular configuration. This is physical failure accompanied by coordinate transformation. Accordingly, such positional control failure cannot be prevented by computational contrivance.

In the conventional master-slave systems, the slave robot is position-controlled, but if the positional control is performed in the work coordinate system, the singular configuration problem occurs. More specifically, positional control failure occurs in the vicinity of the singular configuration unless approach to the vicinity of the singular configuration is avoided. On the other hand, if the slave robot is caused to move so as to avoid the vicinity of the singular configuration in order not to risk failure, additional disadvantages which are difficult to overcome arise as follows:

i) the working space of the slave robot is narrowed, leading to the need to increase the scale of the robot more than necessary; and ii) the singular configuration for the slave robot cannot be positively utilized for task achievement.

Note that Non-Patent Document 5 describes in detail an approach to positively utilize the singular configuration.

As a countermeasure against the singular configuration problem, Non-Patent Document 6 describes on p. 476 a method in which, when any joint of the master robot or the slave robot reaches the limit of the range of movement or a singular configuration, feedback to the master is made in order to cause an opposite force to be exerted. Moreover, to solve the singular configuration problem with the double-structure master-slave system, Non-Patent Document 7 proposes a method in which assist gain is adjusted in accordance with the distance from a singular configuration (manipulability measure). Both of these methods are a kind of approach to avoid the singular configuration by causing the feel of manipulation to be heavy in the vicinity of the singular configuration and thereby allowing the operator to know that the singular configuration is approaching. That is, even by using the approaches of Non-Patent Documents 6 and 7, it is still not possible to overcome the aforementioned disadvantages i) and ii).

As another countermeasure to the singular configuration problem, Non-Patent Document 8 proposes a singular configuration consistent approach. This approach is a control method utilizing the adjugate of the Jacobian matrix, and inhibits the joint velocity from becoming excessively high and thereby preventing positional control failure. In addition, it is rendered possible to eliminate the need to avoid the singular configuration and thereby overcome the disadvantages i) and ii). However, although no failure occurs, the joint velocity is still limited, and therefore, detriment to operability in the vicinity of the singular configuration is unavoidable. Non-Patent Document 8 has an approach devised to not cause detriment to operability, and the approach of Non-Patent Document 8 can suppress such detriment but cannot be used to cause no detriment at all.

On the other hand, in the case of the force-projecting bilateral control, the slave robot is not position-controlled, but is controlled in terms of driving force. For example, in the case where the driving force control is implemented on the slave robot, as in Expression (19), it is simply necessary to obtain the transpose $J_s^T$ of the Jacobian matrix on the basis of differential kinematics, and the inverse $J_s^{-1}$ of the Jacobian matrix does not need to be obtained. In the case of the force-projecting bilateral control where the driving force control is performed on the slave robot, inherently, the slave robot does not have the singular configuration problem, therefore, it is not necessary to avoid the singular configuration for the slave robot, and there are no such disadvantages i) and ii) as mentioned above. In other words, the force-projecting bilateral control has the following advantages:

i') the entire range of movement (i.e., the entire working space) of the slave robot can be utilized; and ii') the singular configuration for the slave robot can be positively utilized for task achievement.

Non-Patent Document 9 mentions on p. 116 a "position-force loop" as control in the opposite direction to the force-reflecting bilateral control and the force-reflecting servo bilateral control, but no other detailed description of such control is given in the document, and therefore, conceivably this control does not correspond to the force-projecting bilateral control.

Furthermore, Non-Patent Document 9 describes on p. 116 that "the position-force loop is not implemented effectively", and also describes the reason as follows: "force control for the slave robot is unstable". These descriptions suggest that the common technical knowledge in the art is that implementation of the "position-force loop" is extremely difficult or even impossible.

PRIOR ART DOCUMENTS

Patent Documents

Patent Document 1: Japanese Patent No. 5105450
Patent Document 2: Japanese Patent Application No. 2013-28989

Non-Patent Documents

Non-Patent Document 1: Miyazaki and Hagihara, "Parallel Control Method for a Bilateral Master-Slave Manipulator", Journal of the Robotics Society of Japan, Vol. 7, No. 5, pp. 446-452, 1989

Non-Patent Document 2: Yokokohji and Yoshikawa, "Maneuverability of Master-Slave Telemanipulation Systems", Transactions of the Society of Instrument and Control Engineers, Vol. 26, No. 5, pp. 572-579, 1990

Non-Patent Document 3: Tachi and Sakaki, "Impedance Controlled Master Slave Manipulation System Part I, Basic Concept and Application to the System with Time Delay", Journal of the Robotics Society of Japan, Vol. 8, No. 3, pp. 241-252, 1990

Non-Patent Document 4: Yoshinada, "A Study on the Large-Scale Bilateral Manipulator", Tokyo institute of Technology Doctoral Thesis, 2012

Non-Patent Document 5: Kotosaka and Ohtaki, "Selective Utilization of Actuator for a Humanoid Robot by Singular Configuration", Journal of the Robotics Society of Japan, Vol. 25, No. 8, pp. 1259-1265, 2007

Non-Patent Document 6: Arai and Nakano, "Bilateral Master-Slave Control for Manipulators with Different Configurations", Journal of the Robotics Society of Japan, Vol. 4, No. 5, pp. 469-479, 1986

Non-Patent Document 7: Yoshinaga, Shimogawa, and Ozaki, "Different Configuration Master-Slave Robot Arms System by Two Industrial Robots", Proceedings of Robotics and Mechatronics Conference 2008, The Japan Society of Mechanical Engineers, 1A1-G16, 2008

Non-Patent Document 8: Tsumaki, Kotera, Nenchev, and Uchiyama, "Singularity-Consistent Teleoperation of a 6-DOF Manipulator", Journal of the Robotics Society of Japan, Vol. 16, No. 2, pp. 195-204, 1998

Non-Patent Document 9: Thurston L. Brooks, "Telerobotic Response Requirements", Proceedings of the IEEE International Conference on Systems, Man and Cybernetics, pp. 113-120, 1990

Non-Patent Document 10: D. L. Pieper, "The Kinematics of Manipulators under Computer Control", Stanford Artificial Intelligence Report, memo no. AI-72, 1968

Non-Patent Document 11: Ryo Kikuuwe, Satoshi Yasukouchi, Hideo Fujimoto, and Motoji Yamamoto, "Proxy-Based Sliding Mode Control: A Safer Extension of PID Position Control", IEEE Transactions on Robotics, Vol. 26, No. 4, pp. 670-683, 2010

DISCLOSURE OF THE INVENTION

Problems to be Solved by the Invention

As described above, the force-projecting bilateral control has a number of advantages which the conventional bilateral control lacks, but on the other hand, the force-projecting bilateral control has the following problems to be solved.

Specifically, in the case of the force-projecting bilateral control, the slave robot is not position-controlled, as described in conjunction with "Characteristic 6", but is controlled in terms of driving force, so that there is no singular configuration problem with the slave robot. However, in the case of the force-projecting bilateral control, the master robot is position-controlled, and if the positional control is performed in the work coordinate system, the singular configuration problem arises in the master robot, rather than in the slave robot. Even if the position control law does not involve the inverse of the Jacobian matrix in computation, as in the case of Expression (18), physical failure is accompanied by coordinate transformation, so that positional control failure also occurs in the vicinity of a singular configuration.

The present invention has been achieved under the above circumstances, with a problem thereof being to provide a master-slave system capable of solving a singular configuration problem for both a master robot and a slave robot.

Solution to the Problems

After diligent studies to solve the above problem, the present inventor has completed the present invention on the basis of the following findings:

i) because the master robot is at most the size of a human, the master robot is not provided in a larger scale than necessary even if the entire operation domain for a human is designed to be included in the operation domain for the master robot excluding the vicinity of a singular configuration;

ii) because the output power demanded for the master robot is at most the same level as human power, and in the case of the force-projecting bilateral control, the master robot can be provided as a robust and powerful mechanism with a high reduction ratio, as described in conjunction with "Characteristic 2", it is not necessary to positively utilize the singular configuration for the master robot; and the following finding based on these findings i) and ii):

iii) as for the master-slave system to which the force-projecting bilateral control is applied, unlike in the case of the master-slave system to which the conventional bilateral control is applied, it is not disadvantageous to cause the master robot to move so as to avoid the vicinity of the singular configuration.

Specifically, the present invention is directed to a master-slave system having a master robot and a slave robot and being subjected to bilateral control, the master robot being an admittance-type haptic device manipulated by an operator, the slave robot being at least electrically connected to the master robot and having portions at least other than the trunk operating mechanically independent of the master robot, the system including:

at least one master actuator for generating a master driving force to position-control the master robot; at least one slave actuator for generating a slave driving force to control the slave robot in terms of driving force; at least one master displacement sensor for measuring a master displacement for the master robot; at least one slave displacement sensor for measuring a slave displacement for the slave robot; at least one operating force sensor for measuring a master operating force applied to the master robot by the operator; a master target displacement calculating device for mapping the slave displacement and thereby obtaining a master target displacement which is a target value for the master displacement corresponding to the slave displacement; and a slave target driving force calculating device for obtaining a slave target driving force which is a target value for the slave driving force, on the basis of the master operating force, wherein, the slave actuator is adapted to generate the slave driving force on the basis of the slave target driving force, whereas the master actuator is adapted to generate the master driving force on the basis of the master target displacement and the master displacement, thereby (1) eliminating the need for a working force sensor adapted for the bilateral control and to measure a slave working force applied to the environment by the slave robot, and (2) allowing the operator to feel the sense of slave dynamics without feeling the sense of master dynamics, and the mapping by the master target displacement calculating device is predefined such that a set of master target displacements excludes a singular configuration for the master robot, thereby (3) allowing a singular configuration problem for both the master robot and the slave robot to be solved in the entire range of movement of the slave robot regardless of whether the slave robot and the master robot have the same structure or different structures.

In the master-slave system, preferably, the master target displacement calculating device obtains the master target displacement corresponding to the slave displacement by calculating inverse kinematics of the master robot in a master joint coordinate system for the master robot, whereby the positional control of the master robot by the master actuator is performed in the master joint coordinate system.

Furthermore, in the master-slave system, preferably, the master robot has a mechanism configured such that the inverse kinematics of the master robot is analytically calculated without requiring numerically iterative convergence calculation. As for such a configuration, for example, it is conceivable that the master robot has six or less degrees of freedom, among the six or less degrees of freedom, three consecutive degrees of freedom are permitted by three rotational joints constituting a single serial link mechanism, and rotation axes of the three rotational joints or extensions thereto cross one another at a point.

Still further, in the master-slave system, preferably, the master robot is selected from among a plurality of master robots, the slave robot is selected from among a plurality of slave robots electrically connectable to any of the master robots, and the selected master robot and the selected slave robot are electrically connected to each other.

Effect of the Invention

The present invention renders it possible to provide a master-slave system capable of solving a singular configuration problem for both a master robot and a slave robot.

MODE FOR CARRYING OUT THE INVENTION

Hereinafter, embodiments of the present invention will be described with reference to the drawings.

Figure 1:
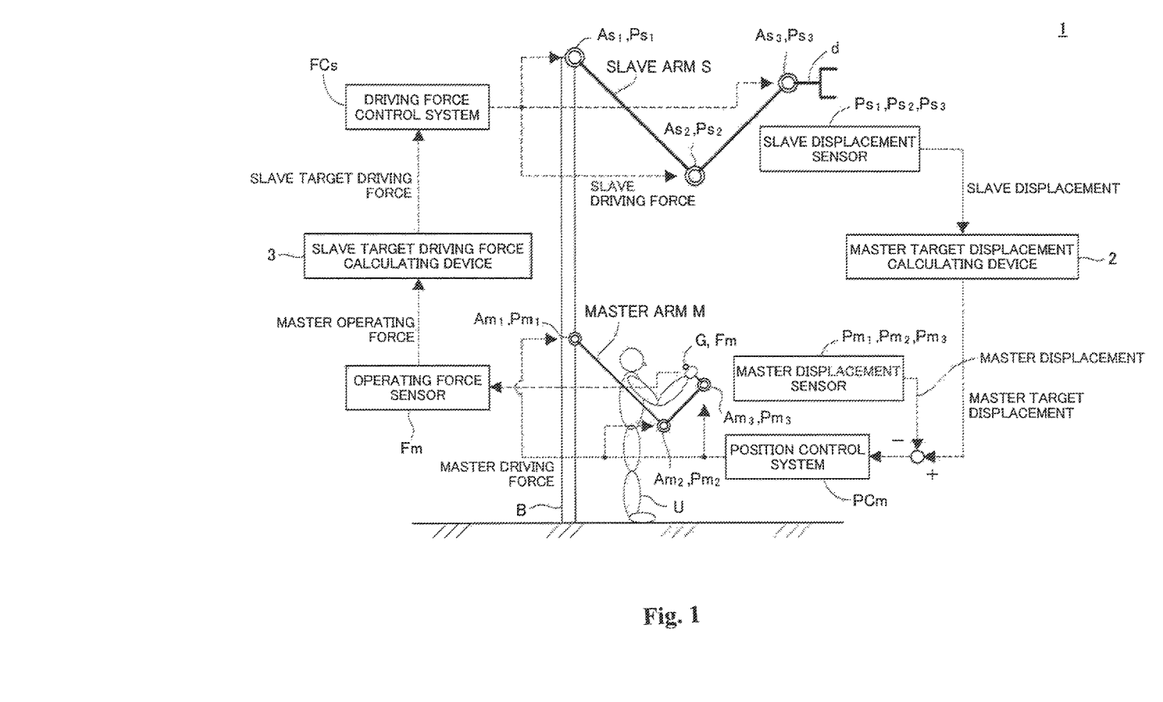
FIG. 1 is a schematic diagram of a force-projecting type master-slave system according to the present invention.

As shown in FIG. 1, a force-projecting type master-slave system 1 according to the present invention (more precisely, a master-slave system to which force-projecting bilateral control is applied) includes a master robot with a master arm M and a slave robot with a slave arm S, the master arm M and the slave arm S being provided at different positions on a trunk B and electrically connected to each other in a manner as will be described below. In the force-projecting type master-slave system 1, the master arm M is an admittance-type haptic device manipulated by an operator U.

The master arm M and the slave arm S respectively have a grip G, which serves as an operating end, and a working end d at one end, and are joined at the other end to different positions on the trunk B. Moreover, each of the master arm M and the slave arm S has two links and also has a joint (e.g., a rotational joint) at each of the end connected to the grip G or the working end d, the other end connected to the trunk B, and the connection between the links. Accordingly, each of the master arm M and the slave arm S has three degrees of freedom.

Provided at these joints are master displacement sensors $Pm_1$, $Pm_2$, and $Pm_3$, slave displacement sensors $Ps_1$, $Ps_2$, and $Ps_3$, master actuators $Am_1$, $Am_2$, and $Am_3$, and slave actuators $As_1$, $As_2$, and $As_3$. In addition, the grip G is provided with an operating force sensor $F_m$. Further, the force-projecting type master-slave system 1 includes a positional control system $PC_m$, a master target displacement calculating device 2, a driving force control system $FC_s$, and a slave target driving force calculating device 3, as shown in FIG. 1.

Herein, the master arm M, the master displacement sensors $Pm_1$, $Pm_2$, and $Pm_3$, the master actuators $Am_1$, $Am_2$, and $Am_3$, the operating force sensor $F_m$ (or the grip G), and the positional control system $PC_m$ are included in the master robot, and the slave arm S, the slave displacement sensors $Ps_1$, $Ps_2$, and $Ps_3$, the slave actuators $As_1$, $As_2$, and $As_3$, and the driving force control system $FC_s$ are included in the slave robot.

The operating force sensor $F_m$ is provided in the master arm M, and measures a master operating force $f_m$ from the operator U. The master displacement sensors $Pm_1$, $Pm_2$, and $Pm_3$ are provided at the joints of the master arm M, and measure master displacements $q_m$ and $x_m$. Moreover, the slave displacement sensors $Ps_1$, $Ps_2$, and $Ps_3$ are provided at the joints of the slave arm S, and measure slave displacements $q_s$ and $x_s$.

The master target displacement calculating device 2 calculates master target displacements, which are target values for the master displacements $q_m$ and $x_m$, on the basis of the measured slave displacements $q_s$ and $x_s$. Moreover, the slave target driving force calculating device 3 calculates a slave target driving force, which is a target value for a slave driving force $\tau_s$ to be described later, on the basis of the measured master operating force $f_m$.

The slave actuators $Ps_1$, $Ps_2$, and $Ps_3$ are provided at the joints of the slave arm S, and generate the slave driving force $\tau_s$ through the slave driving force control system $FC_s$ on the basis of the slave target driving force, whereby the slave arm S is controlled in terms of driving force. On the other hand, the master actuators $Am_1$, $Am_2$, and $Am_3$ are provided at the joints of the master arm M, and generate a master driving force $\tau_m$ on the basis of the master displacements $q_m$ and $x_m$ and the master target displacements, whereby the master arm M is position-controlled. More specifically, the master actuators $Am_1$, $Am_2$, and $Am_3$ generate the master driving force $\tau_m$ through the positional control system $PC_m$, such that the deviation between a signal from each of the master displacement sensors $Pm_1$, $Pm_2$, and $Pm_3$ and a signal from the master target displacement calculating device 2 is 0.

In this manner, in the force-projecting type master-slave system 1, the slave actuators $As_1$, $As_2$, and $As_3$, which generate the slave driving force $\tau_s$, control the slave arm S in terms of driving force, whereas the master actuators $Am_1$, $Am_2$, and $Am_3$, which generate the master driving force $\tau_m$, position-control the master arm M.

Figure 2:
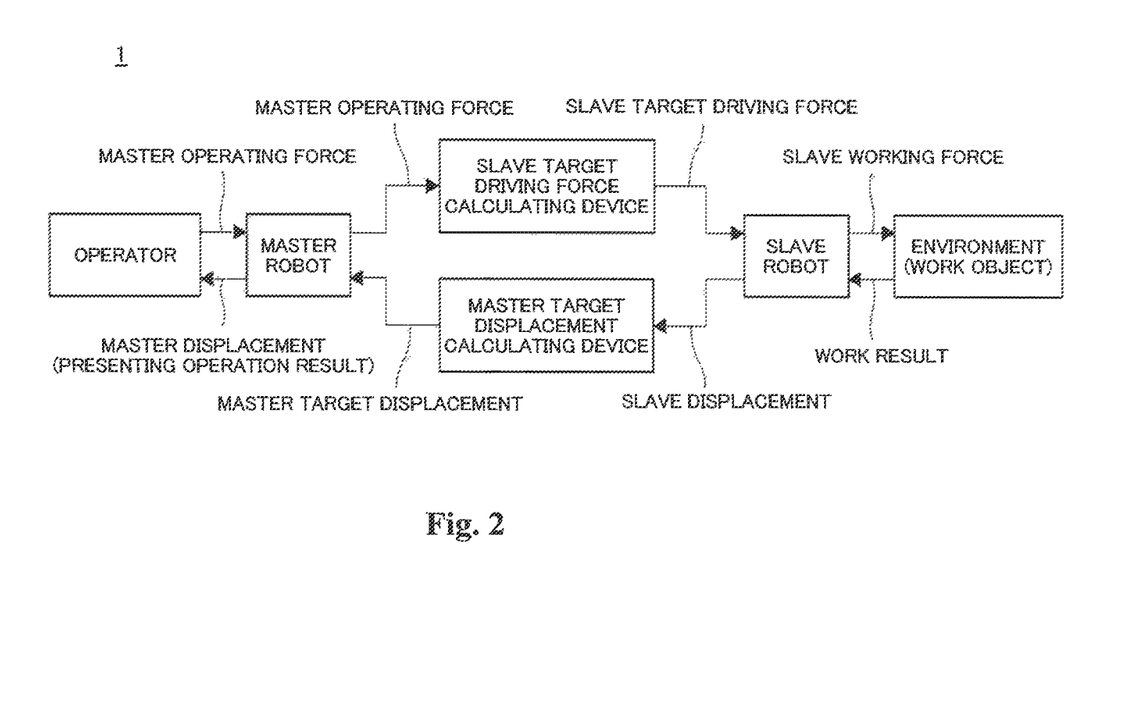
FIG. 2 is a control block diagram of the force-projecting type master-slave system according to the present invention.

FIG. 2 represents the above configuration in a control block diagram. In FIG. 2, the master robot includes the master arm M, the master displacement sensors $Pm_1$, $Pm_2$, and $Pm_3$, the master actuators $Am_1$, $Am_2$, and $Am_3$, the operating force sensor $F_m$ (or the grip G), and the positional control system $PC_m$. Also, the slave robot includes the slave arm S, the slave displacement sensors $Ps_1$, $Ps_2$, and $Ps_3$, the slave actuators $As_1$, $As_2$, and $As_3$, and the driving force control system $FC_s$.

The force-projecting type master-slave system 1 according to the present invention is different from the basic force-projecting type master-slave system proposed in Patent Document 1 by the present inventor, in terms of computation by the master target displacement calculating device 2. More specifically, the master target displacement calculating device 2 of the force-projecting type master-slave system 1 according to the present invention obtains a master target displacement $x_{md}$ corresponding to the slave displacement $x_s$ using a mapping $\varphi$, which is predefined such that a set of master target displacements $x_{md}$ excludes a singular configuration for the master robot.

The force-projecting bilateral control according to the present invention uses a master control law, for example, as represented by the following expression, in place of the master control law (18).

[Expression 29]

$$\tau_m = J_m^T K_p (x_{md} - x_m) \tag{29}$$

As for the slave control law, on the other hand, the aforementioned slave control law (19) is used without modification.

Furthermore, in the force-projecting bilateral control according to the present invention, the master target displacement calculating device 2 uses a mapping $\varphi$ as defined below. First, assuming that a set $X_m$ in a master operation domain is such that $X_m \ni x_m$, and a set $X_s$ in a slave work domain is such that $X_s \ni x_s$, a mapping $\varphi$ between these sets is defined as shown below.

[Expression 30]

$$\varphi: X_s \to X_m \tag{30}$$

Furthermore, each set $X_{mS}$ in the vicinity of all singular configurations within the master operation domain is assumed to be such that $X_{mS} \subset X_m$. In this case, the mapping $\varphi$ is set such that the following expression is established for the image $X_{md} = (\varphi(X_s) \ni x_{md}$ of the set $X_s$ under the mapping $\varphi$.

[Expression 31]

$$X_{md} \subset X_m \text{ and } X_{md} \cap X_{mS} = \emptyset \tag{31}$$

The mapping $\varphi$ thus defined renders it possible to obtain the master target displacement $x_{md} = \varphi(x_s)$ which corresponds to the slave displacement $x_s$, so as to avoid the vicinity of the singular configuration for the master robot. In addition, this renders it possible to solve the singular configuration problem for both the master robot and the slave robot.

The set $X_{mS}$ in the vicinity of the singular configuration depends on the mechanism of the master robot, and therefore, upon implementation, it is necessary to specifically define the mapping $\varphi$ for each master robot, but expectedly, in most cases, it is sufficient to simply use a mapping $\varphi$ obtained by adding a translation (or an offset) of $x_{mdo}$ to the scale transformation $x_{md} = S_p x_s$, as represented by the following expression, set $x_{mdo}$ as a position corresponding to the vicinity of the center of the master operation domain, and set the scale ratio $S_p$ low to such a degree that the master target displacement $x_{md}$ does not contain the vicinity of the singular configuration.

[Expression 32]

$$x_{md} = \varphi(x_s) = S_p x_s + x_{mdo} \tag{32}$$

In the case where the simple mapping $\varphi$ represented by Expression (32) does not suffice, it is simply required to define the mapping $\varphi$ by a linear transformation, including a simple scale transformation (i.e., scaling) and a translation combined with rotation and shearing of a so-called affine transformation. In addition, the mapping $\varphi$ can also be defined by a projective transformation or an appropriate nonlinear transformation.

Non-Patent Document 4 describes on pp. 78-85 an approach of correlating a master operation domain and a slave work domain in a double-structure master-slave system, but this approach is "a method for allowing the directions of movement of the master and the slave in different shapes to roughly match each other approximately in the entire range of movement", and cannot solve the singular configuration problem as can the present invention.

The positional control of the master robot has been described above as being performed in the work coordinate system in accordance with the master control law (29), but by using the inverse kinematics of the master robot, the positional control can be performed, for example, in a master joint coordinate system in accordance with the following master control law (33).

[Expression 33]

$$\tau_m = K_p(q_{md} - q_m) \quad (33)$$

The master joint displacement $q_m$ and its target value, master target joint displacement $q_{md}$, are as shown below. Note that the master joint displacement $q_m$ is equivalent to the posture of the master robot, and therefore, will also be referred to herein as the posture $q_m$.

[Expression 34]

$$q_m = \psi_m^{-1}(x_m) \quad (34)$$

[Expression 35]

$$q_{md} = \psi_m^{-1}(x_{md}) = \psi_m^{-1}(\varphi(x_s)) \quad (35)$$

In Expressions (34) and (35), $\psi^{-1}$ is a nonlinear function representing the inverse kinematics of the master robot. As described earlier, in the present invention, the mapping p is defined so as to cover the entire slave work domain $X_s$ while avoiding the singular configuration for the master robot, and therefore, the inverse kinematics $\psi_m^{-1}(\varphi(x_s))$ always has a solution.

The master control law (29) uses the Jacobian matrix $J_m(q_m)$ for positional control in the work coordinate system, and therefore, the gain $J_m^T K_p$ for displacement error in the work coordinate system changes depending on the posture $q_m$ of the master robot. That is, a gain appropriate for a posture might not be appropriate for another posture. On the other hand, in the case of the master control law (33), the gain $K_p$ for displacement error in the master joint coordinate system is a constant independent of the posture $q_m$ of the master robot, and therefore, system stability is expected to be enhanced.

The inverse kinematics $\psi_m^{-1}(\varphi(x_s))$ in the master control law (33) has been described as always having a solution, but the solution is not always analytically derivable. In particular, it is often the case that the inverse kinematics of a link mechanism having a number of degrees of freedom does not have a general analytical solution. In the case where there is no analytical solution, it is necessary to derive a solution through a numerical solution method, i.e., numerically iterative convergence calculation by a computer, but such calculation imposes an extremely high burden on the control system.

However, for example, mechanisms of most industrial robot arms are devised such that solutions can be analytically derived without using a numerical solution method. In this regard, Non-Patent Document 10 indicates that the general solution to inverse kinematics can be analytically derived so long as the robot to be controlled satisfies the following two conditions:

i) the number of degrees of freedom of the robot is six or less; and ii) among the six or less degrees of freedom, three consecutive degrees of freedom are permitted by three or more rotational joints constituting a single serial link mechanism, and the rotation axes of the three rotational joints or their extensions cross one another at a point.

Accordingly, in the present invention also, the master robot is provided as such a mechanism, so that the solution to the inverse kinematics $\psi_m^{-1}(\varphi(x_s))$ in the master control law (33) can be analytically derived, and the positional control of the master robot can be performed in a fast and simple manner in accordance with the master control law (33).

In conventional master-slave systems not being of the force-projecting type, the slave robot is position-controlled, and therefore, to enhance system stability using inverse kinematics and also achieve fast and simple control, the slave robot is preferably structured with analytically derivable inverse kinematics such that the above conditions i) and ii) are satisfied. However, the slave robot is primarily required to have working performance to achieve its tasks, and there is difficulty in having the structure intended to both realize required working performance and allow analytical derivation of inverse kinematics. In this regard, the master robot is simply required to have a structure that can be readily manipulated by a human, and therefore, it is relatively easy to provide a structure that allows analytical derivation of inverse kinematics and is superior in operability.

Figure 3:
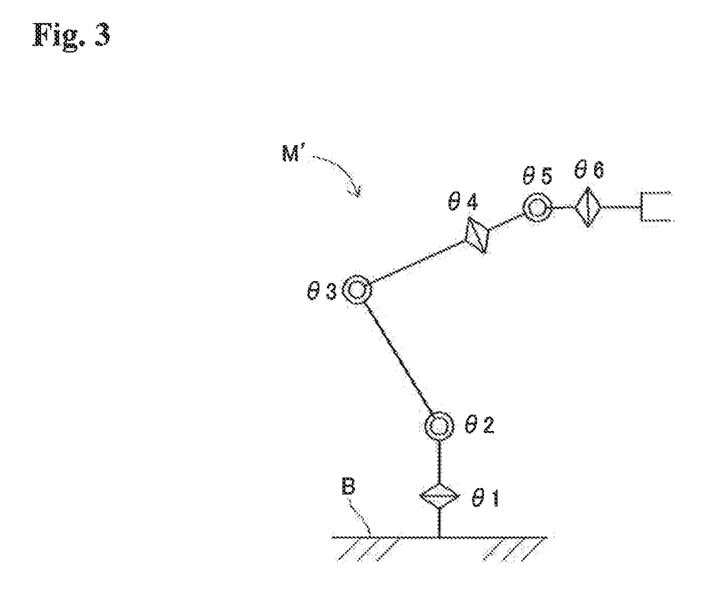
FIG. 3 is a schematic diagram showing an example of a master arm of the force-projecting type master-slave system according to the present invention.

FIG. 3 shows an example of a master robot (master arm M') which satisfies the conditions i) and ii). As shown in the figure, the master arm M' includes six rotational joints indicated at $\theta 1$ to $\theta 6$, and therefore, has six degrees of freedom. Moreover, among the rotational joints $\theta 1$ to $\theta 6$, the three consecutive rotational joints $\theta 4$ to $\theta 6$ constitute a serial link mechanism, and further, an extension to the rotation axis of the rotational joint $\theta 4$ and an extension to the rotation axis of the rotational joint $\theta 6$ cross each other at a point on the rotation axis of the rotational joint $\theta 5$.

Note that, for example, the rotational joints $\theta 1$, $\theta 2$, and $\theta 4$ cannot be said to be consecutive. Also, for example, the rotational joints $\theta 1$, $\theta 2$, and $\theta 3$ are consecutive but their rotation axes (or extensions thereto) do not cross one another at a point.

Figure 4:
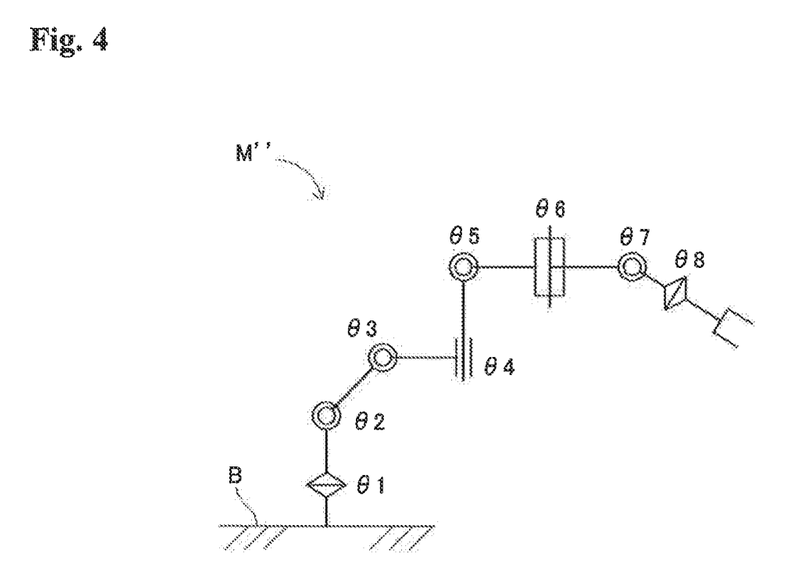
FIG. 4 is a schematic diagram showing an example of a master arm which is inappropriate as a master arm of the force-projecting type master-slave system according to the present invention.

FIG. 4 shows an example of a master robot (master arm M") which does not satisfy the conditions i) and ii). As shown in the figure, the master arm M" has eight degrees of freedom permitted by seven rotational joints indicated at $\theta 1$ to $\theta 3$ and $\theta 5$ to $\theta 8$ as well as one prismatic joint indicated at $\theta 4$, and therefore, does not satisfy the condition i). Moreover, the master arm M" has three sets of three consecutive rotational joints ($\theta 1$ to $\theta 3$, $\theta 5$ to $\theta 7$, and $\theta 6$ to $\theta 8$), but none of the sets includes joints whose rotation axes (or extensions thereto) cross one another at a point. Accordingly, the master arm M" dose not satisfy the condition ii) either.

The force-projecting type master-slave system according to the present invention may be a master-slave system constructed by electrically connecting one master robot selected from among a plurality of master robots and one slave robot selected from among a plurality of slave robots that can be electrically connected to any of the master robots. As described above, the master robot is required to have operability, whereas the slave robot is required to have workability, and if the above configuration is provided, it is possible to use a preferable master robot (i.e., the user's own preferred master robot) and also change the slave robots to choose from, depending on tasks, resulting in such advantages as rendering it possible to shorten the period of training for acquiring skills and also to deal with a wide variety of tasks which cannot be completed simply by changing an end effector provided at the working end of the slave robot.

The above configuration is suitable for use in, for example, a master-slave system serving as a surgical robotic system. As for the master, a surgeon can select a well-adjusted master robot in accordance with his/her body size, skills, and preferences, and as for the slave, a suitable one for the operative procedure can be selected from among a wide variety of slave robots prepared in advance. Moreover, the above configuration is also suitable for the case where it is desired for one master robot to selectively operate either a small slave robot such as a surgical robot or a large slave robot such as a power-amplifying robot.

In the case of the conventional master-slave systems with the singular configuration problem, it is necessary to address the singular configuration problem for each combination of the master robot and the slave robot, and therefore, it is extremely difficult to construct a master-slave system by connecting a master robot and a slave robot, each being selected at will, as described above, from among a plurality of master robots or a plurality of slave robots.

However, since the force-projecting type master-slave system according to the present invention renders it possible to solve the singular configuration problem for both the master robot and the slave robot, it is rendered possible to readily construct a master-slave system including an arbitrary combination of a master robot and a slave robot, simply by manually or automatically defining a mapping $\varphi$ based on information held in the master robot and the slave robot when the master robot and the slave robot are selected and connected, the slave robot holding information regarding the entire range of movement (or the entire work domain), i.e., information regarding sets $X_s$ in the slave work domain, the master robot holding information regarding the entire range of movement (or the entire operation domain) as well as information regarding the vicinity of singular postures, i.e., information regarding sets $X_m$ in the master operation domain and information regarding sets $X_{mS}$ in the vicinity of all singular configurations in the master operation domain. Note that the defining of the mapping $\varphi$ can be readily automated, for example, by a method which can adjust $S_p$ and $x_{mdo}$ in Expression (32).

[Points to be Noted]

The terms "master robot" and "slave robot" are used herein for convenience, but the present invention is not necessarily limited only to the application to typical and orthodox robots. The master-slave system and the bilateral control are expected to be used in a wide variety of applications, and the present invention can be applied to any electrical master-slave systems. For example, any systems called "X-by-Wire" are electrical master-slave systems. Accordingly, in the case where the bilateral control is used not only in master-slave robotic systems but also in X-by-Wire systems for vehicles, airplanes, vessels, and any other types of operable machine, the present invention can be applied without modification.

The terms "displacement" and "position" herein are intended to mean a generalized displacement and encompass a position and a posture in translation and rotation. Similarly, the term "force" is intended to mean a generalized force and encompass a translational force and a rotational force (or torque).

The specific control laws for various types of bilateral control are mere examples for the sake of explanation, and higher-level control laws can be used so long as the purpose of control remains the same. For example, proportional control is used as the positional control law, but it is understood that high-level control such as PID control, proxy-based sliding mode control, which is an extended version of the PID control (see Non-Patent Document 11), or a further extended version thereof as described in Patent Document 2, can also be used.

The operating force sensor does not have to be a hardware force sensor, and may be a means for estimating an operating force on the basis of a current from an electromagnetic actuator or a pressure from a hydro-pneumatic actuator or may be a means for estimating an operating force using an observer or suchlike on the basis of, for example, a signal from a displacement sensor.

In the force-projecting bilateral control, the result of operation is presented as displacement information, using a wide frequency range from DC at lower limit to about hundreds of Hz to 1 kHz at upper limit. The result of operation does not have to be presented by one type of actuator, and may be presented by a plurality of actuators capable of presenting different frequency ranges from each another. Conceivable examples of a combination of such actuators include a combination of large and small motors (i.e., a so-called macro-micro system) and a combination of a motor in charge of a low-frequency range and an oscillator, a speaker, a voice coil motor, or the like in charge of a high-frequency range.

DESCRIPTION OF THE REFERENCE CHARACTERS 1 master-slave system
2 master target displacement calculating device
3 slave target driving force calculating device
M master arm
S slave arm
$F_m$ operating force sensor
$FC_s$ driving force control system
$PC_m$ positional control system
$Am_1$ to $Am_3$ master actuator
$As_1$ to $As_3$ slave actuator
$Pm_1$ to $Pm_3$ master displacement sensor
$Ps_1$ to $Ps_3$ slave displacement sensor

The invention claimed is:

1. A master-slave system having a master robot and a slave robot and being subjected to bilateral control, the master robot being an admittance-type haptic device manipulated by an operator, the slave robot being at least electrically connected to the master robot and having portions at least other than the trunk operating mechanically independent of the master robot, the system comprising:
at least one master actuator for generating a master driving force to position-control the master robot;
at least one slave actuator for generating a slave driving force to control the slave robot in terms of driving force;
at least one master displacement sensor for measuring a master displacement for the master robot;
at least one slave displacement sensor for measuring a slave displacement for the slave robot;
at least one operating force sensor for measuring a master operating force applied to the master robot by the operator;
a master target displacement calculating device for mapping the slave displacement and thereby obtaining a master target displacement which is a target value for the master displacement corresponding to the slave displacement; and
a slave target driving force calculating device for obtaining a slave target driving force which is a target value for the slave driving force, on the basis of the master operating force, wherein,
the slave actuator is adapted to generate the slave driving force on the basis of the slave target driving force, whereas the master actuator is adapted to generate the master driving force on the basis of the master target displacement and the master displacement, thereby:

(1) eliminating the need for a working force sensor adapted for the bilateral control and to measure a slave working force applied to the environment by the slave robot; and
(2) allowing the operator to feel the sense of slave dynamics without feeling the sense of master dynamics, and the mapping by the master target displacement calculating device is predefined such that a set of master target displacements excludes a singular configuration for the master robot, thereby
(3) allowing a singular configuration problem for both the master robot and the slave robot to be solved in the entire range of movement of the slave robot regardless of whether the slave robot and the master robot have the same structure or different structures.

2. The master-slave system according to claim 1, wherein, the master target displacement calculating device obtains the master target displacement corresponding to the slave displacement by calculating inverse kinematics of the master robot in a master joint coordinate system for the master robot, whereby, the positional control of the master robot by the master actuator is performed in the master joint coordinate system.

3. The master-slave system according to claim 2, wherein the master robot has a mechanism configured such that the inverse kinematics of the master robot is analytically calculated without requiring numerically iterative convergence calculation.

4. The master-slave system according to claim 3, wherein,
the master robot has six or less degrees of freedom,
among the six or less degrees of freedom, three consecutive degrees of freedom are permitted by three rotational joints constituting a single serial link mechanism, and
rotation axes of the three rotational joints or extensions thereto cross one another at a point.

5. The master-slave system according to claim 1, wherein,
the master robot is selected from among a plurality of master robots,
the slave robot is selected from among a plurality of slave robots electrically connectable to any of the master robots, and
the selected master robot and the selected slave robot are electrically connected to each other.

* * * * *